United States Patent [19]

Hartman

[11] 4,153,380
[45] May 8, 1979

[54] SOIL PENETRATION EMITTER FOR DRIP IRRIGATION SYSTEMS

[76] Inventor: Gary R. Hartman, 401 Valencia School Rd., Aptos, Calif. 95003

[21] Appl. No.: 827,715

[22] Filed: Aug. 25, 1977

[51] Int. Cl.$^2$ ............................................. E02B 13/00
[52] U.S. Cl. ......................................... 405/39; 47/48.5
[58] Field of Search .................. 61/10, 11, 12, 13, 53; 47/48.5; 251/208, 209

[56] References Cited

U.S. PATENT DOCUMENTS

| 973,887 | 10/1910 | Steinmetz | 61/53 |
|---|---|---|---|
| 1,677,153 | 7/1928 | Spencer | 61/13 X |
| 2,197,954 | 4/1940 | Turpin | 251/209 X |
| 2,491,124 | 12/1949 | Martin | 61/10 X |
| 2,875,713 | 3/1959 | Shoffner | 47/48.5 X |
| 3,409,270 | 11/1968 | Hulsey | 251/209 |
| 3,851,896 | 12/1974 | Olsen | 61/12 X |

Primary Examiner—Mervin Stein
Assistant Examiner—David H. Corbin
Attorney, Agent, or Firm—Owen, Wickersham & Erickson

[57] ABSTRACT

An emitter device for a drip type irrigation system. The emitter has an elongated body with a tapered portion at its lower end to facilitate easy insertion into the soil. The upper end of the emitter forms a small receiving chamber connectable to an opening. An adjustable valve means is interposed between the chamber and the opening so that the flow of water from a suitable supply source can be regulated. Outlet openings for the emitter are located near or within the tapered portion of the body so that emission is accomplished below ground level.

3 Claims, 4 Drawing Figures

U.S. Patent     May 8, 1979     4,153,380
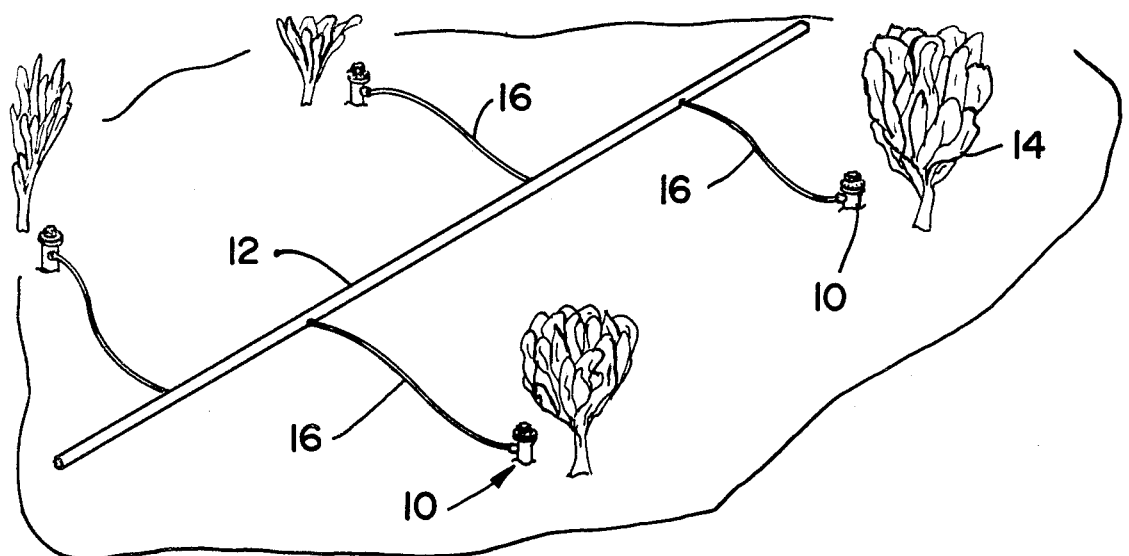
FIG_1
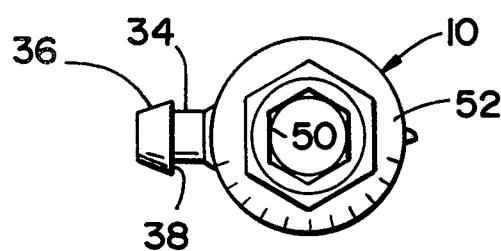
FIG_3
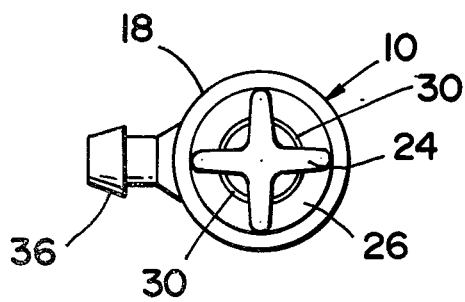
FIG_4
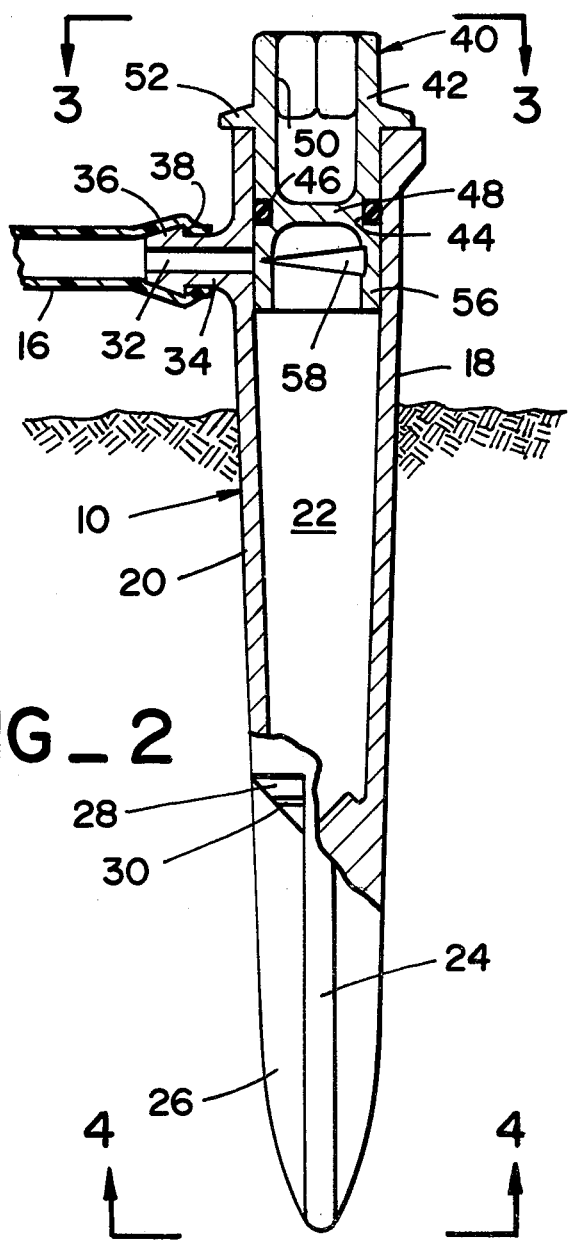
FIG_2

SOIL PENETRATION EMITTER FOR DRIP IRRIGATION SYSTEMS

This invention relates to an improved fluid emitter device particularly adaptable for use in drip irrigation systems.

BACKGROUND OF THE INVENTION

With the increasing emphasis on water conservation and particularly the need for its more efficient use in the growing of a wide variety of crops and other plant life, various forms of drip irrigation systems have been utilized. In such systems, water from a common source under pressure is supplied to a plurality of emitters which allow the water to trickle or drip out at a slow rate. Different forms of emitters for such systems have been developed and many utilize an internal tortuous path for the water in order to create friction and reduce pressure. Almost universally in present drip irrigation systems, the emitters are placed on the ground surface and the water drips out and onto the ground from each emitter placed near the plant. This is often inefficient and unsatisfactory particularly where the ambient temperature may be high or where the soil may be hard. In such situations a large amount of water may be lost to evaporation before it can penetrate the soil to an effective depth. Also, prior art emitters failed to provide suitable means for varying or controlling the flow rate of water from the emitters. Such a capability was found to be vital in many instances in order to compensate for pressure variations at the water source; to accommodate different soil conditions around the plants being irrigated; and also to adjust for the varying irrigation needs of different types of plants, trees or crops.

BRIEF SUMMARY OF THE INVENTION

It is therefore a general object of the present invention to provide an improved fluid emitter for drip type irrigation systems that overcomes the aforesaid disadvantages of prior art emitters.

Another object of the present invention is to provide an improved drip emitter that is capable of being installed in the ground so that water will be emitted below ground level.

Yet another object of the present invention is to provide a fluid emitter for drip irrigation systems having an adjustable means for controlling the flow rate of fluid from the emitter.

Still another object of the present invention is to provide a fluid emitter for a drip irrigation system that is strong and durable and yet particularly well adapted for ease and economy of manufacture.

In its presently preferred form, an emitter according to the present invention comprises an elongated body made from a rigid, durable material such as plastic. At its lower end the body has a tapered shape with a cruciform cross section so that it will easily penetrate the soil when driven by a longitudinally directed force from its upper end. Above the tapered lower end the emitter is hollow and forms a chamber that is closed by a sleeve-like plug. The plug is rotatable within the upper body by means of a suitable tool that fits an appropriate gripping means on the plug. A sealing means between the plug and body members prevents any fluid from escaping around the plug. In a lower skirt portion of the plug is a triangular opening which is located at the same level on the body as an inlet port in its sidewall. The inlet port is surrounded by a spigot projecting from the outer surface of the emitter to which a flexible conduit can be attached and connected to a supply conduit. By rotation of the plug the area of the triangular opening exposed to or aligned with the inlet port can be varied, thereby varying the flow rate into the emitter chamber. When the chamber is full, the water is forced through outlets in the emitter which are conveniently located at the bottom of the chamber where the emitter body starts to taper with its cruciform shape. Thus, water flows slowly through the emitter outlets at a level below the ground surface when the emitter is installed.

Other objects, advantages and features of the invention will become apparent from the following detailed description of one embodiment thereof, presented in conjunction with the accompanying drawing.

BRIEF DESCRIPTION OF THE DRAWING

FIG. 1 is a view in perspective showing a portion of a typical drip irrigation system using emitters according to the present invention;

FIG. 2 is an enlarged fragmentary view in elevation and in section of an emitter embodying principles of the present invention;

FIG. 3 is a top view of the emitter taken along line 3—3 of FIG. 2; and

FIG. 4 is a bottom view of the emitter taken along line 4—4 of FIG. 2.

DETAILED DESCRIPTION OF PREFERRED EMBODIMENT

With reference to the drawing, FIG. 1 shows a portion of a typical drip irrigation system as it appears when installed and utilizing a series of emitters 10 embodying the principles of the present invention. In the installation shown, a supply conduit 12 connected to and extending from a source of water under pressure (e.g. 40–80 psi) is located above ground between rows of spaced apart plants 14. Near the base of each plant an emitter 10 is buried in the soil so that only its upper end is above ground level. A small flexible conduit 16 extends from the upper end of each emitter to the supply conduit 12, and thus water therefrom is constantly forced to each emitter and through its outlets that are located below the ground level.

Turning now to FIGS. 2-4, the emitter 10, as shown, comprises an elongated body 18 that may be made of a suitable material such as metal or molded plastic, that is rigid and durable. The upper portion of the body is hollow, having a relatively thin side wall 20 that forms a chamber 22. A lower end portion of the emitter 10 is integral with its upper portion but is solid and molded to form a series of longitudinal fins 24 that have a cruciform shape in cross section (See FIG. 4). Each fin 24 continuously tapers to a smaller width at its lower end so that the emitter is essentially pointed, in order to enable it to be easily driven into the ground. Between the fins are longitudinal spaces 26 that are terminated at their upper ends by sections of a conical end wall 28 of the chamber 22. Within this latter end wall are small openings 30 through which water from the chamber 22 can flow at a slow rate.

In the sidewall 20 near the upper end of the emitter 10 is a side inlet opening 32. This opening extends through an integral boss member 34 that projects from the sidewall around the opening. This boss member has a conical end surface 36 that terminates at a barblike shoulder 38 which serves to help retain one end of a flexible conduit 16.

Situated within the open upper end of the emitter's chamber is a rotatable plug and valve member 40. This latter member has a sleeve-like body 42 within a cylindrical outer surface that forms a snug fit with the cylindrical sidewall of the upper emitter body, but also with enough clearance to allow for some rotation of the plug valve therein. A groove 44 formed in the outer surface of the valve body 42 forms a seat for an O-ring 46 that maintains a fluid seal around it. At approximately the same location as the O-ring is a transverse wall portion 48. Above the wall portion 48 is a recess 50 in the plug valve 40 with flat inner and outer surfaces that enable it to receive a similarly flat sided wrench for turning the plug valve member. On the outer surface of the valve body 42, between the O-ring 46 and the upper end of the body is an outer periphery flange 52 that bears against the flat end surface 54 of the chamber sidewall 20. In a skirt portion 56 of the plug valve member extending below its wall portion 48 is a triangular shaped opening 58. When the flange 52 of the plug valve member 40 is flush against the flat end surface 54 of the chamber sidewall 20, as shown in the normally assembled emitter of FIG. 2, the triangular shaped opening 58 is directly opposite the inlet opening 32. Thus, it is apparent the amount of fluid flow through the inlet opening 32 is directly related to the position of the plug valve member and its valve opening 58 relative to the opening 32. For example, if the plug valve is oriented so that only the small end of the triangular opening is opposite the inlet opening 32, only a small flow of water will flow into the chamber 22. Similarly, if more of the valve opening is aligned with the inlet opening 32 when plug valve is rotated, a faster flow into the chamber will occur.

When the chamber 22 fills with water, flow from it will occur through its outlet openings 30 between the fins 24 and below the soil surface. This outlet of water will soon balance the inlet flow through the plug valve member and a steady state condition for the emitter will be established.

Thus, it is seen that each emitter can be easily regulated, in a typical irrigation installation as shown in FIG. 1, to provide just the amount of flow that is deemed necessary for a particular plant or crop. As shown in FIG. 3 the upper surface of the flange 52 is preferably marked with suitable indicia so that the position of the valve member can be readily ascertained and moved, if necessary, to the desired position.

Installation of a drip irrigation system utilizing my emitter is a simple matter of forcing each emitter into the soil at its preselected location, connecting the conduit 16 to a supply conduit 12 and adjusting the valve member 40. All of this can be accomplished quickly with relatively unskilled labor and simple tools.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A drip emitter for use in a drip irrigation system, comprising:

an elongated body having an upper portion of sleeve-like configuration, forming an internal chamber open at its upper end and provided with a bottom wall;

a lower body portion intergral with said bottom wall including a plurality of angularly spaced fins extending radially outwardly from the axis of the body and axially downwardly from said bottom wall and tapering from generally the width of the upper body portion down to a narrow point at the lower end, so that the device can be driven into the ground;

means forming an inlet for water from a supply source into said chamber of the upper portion intermediate the ends thereof;

outlet means formed in said chamber adjacent the uppermost ends of the fins for dispensing water from the chamber below the ground surface;

adjustable valve means connected to the upper body portion for controlling the quantity of water flow from the inlet into the chamber; and a hollow cylindrical member rotatably mounted within the open end of the body concentric therewith and having a radially extending peripheral flange bearing against the upper end of said body;

said member having a closure wall extending transversely thereacross interiorly thereof and a skirt portion extending downwardly from said wall over the inlet and snugly fitting within said body;

a tapered, generally triangular aperture extending semi-circumferentially through the wall of said skirt portion substantially in the plane of said inlet means; and means at the upper end of the hollow cylinder and above said wall engageable by a tool to rotate the valve means for adjusting the amount of flow through said inlet and said aperture;

said inlet means including a boss extending from the outside of the upper body portion, with a bore through the boss into said chamber, and an enlarged barb-shaped portion with a conical surface at the outer end of the boss for receiving and retaining a flexible water supply line.

2. The drip emitter as described in claim 1 including indicia on the upper side of said valve flange to indicate the position of said valve relative to said inlet opening and thus the relative amount of flow through said emitter.

3. The drip emitter as described in claim 1 wherein said upper and lower body portions are molded from plastic material as one integral and relatively rigid member.

* * * * *